UNITED STATES PATENT OFFICE.

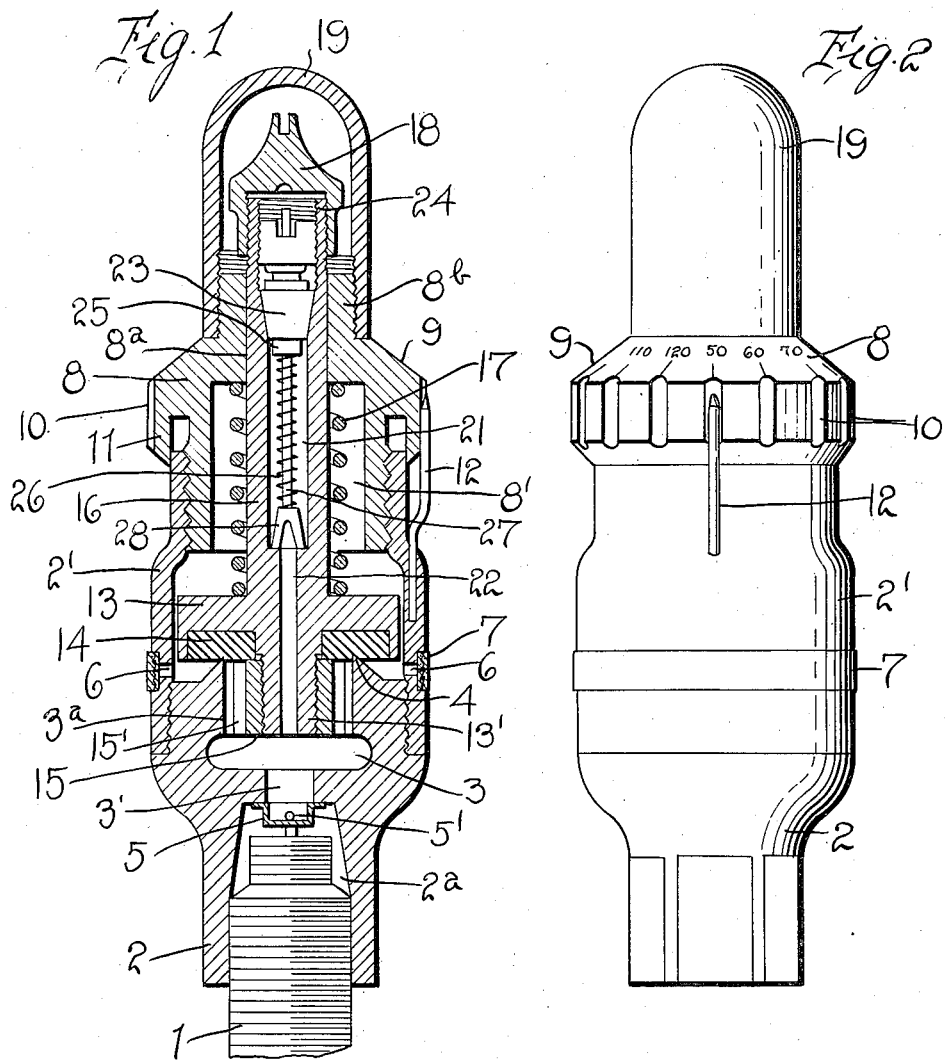

CHARLES HENERY THAYER, OF ELMIRA, NEW YORK, ASSIGNOR OF ONE-FOURTH TO GEORGE P. RANSOM, ONE-FOURTH TO GEORGE A. GUCKER, AND ONE-FOURTH TO MORTIMER L. SULLIVAN, ALL OF ELMIRA, NEW YORK.

PRESSURE-REGULATING DEVICE FOR TIRE-VALVES.

1,156,328.  Specification of Letters Patent.  Patented Oct. 12, 1915.

Application filed February 16, 1915. Serial No. 8,521.

*To all whom it may concern:*

Be it known that I, CHARLES H. THAYER, a citizen of the United States, residing at Elmira, in the county of Chemung and State of New York, have invented certain new and useful Improvements in Pressure-Regulating Devices for Tire-Valves, of which the following is a specification, reference being had to the accompanying drawings.

This application, in part, constitutes a continuation of my prior application for patent, filed April 20, 1914, Serial No. 833,168.

This invention relates to an improved pressure regulating device for tire valves, and has for its primary object to provide a device of this character applicable to the stem of the ordinary tire valve now in common use, and embodying an auxiliary inflating valve in combination with an improved excess pressure release valve mechanism which will permit of the escape of excess pressure from the tire, either at the time of inflating or after the tire has been inflated and placed in use.

The invention has for one of its detail objects to provide a pressure regulating device of the above character which may be adjusted to a desired predetermined tire pressure, and which is so constructed as to effect an instantaneous cut off of the air when the tire is being inflated and the release of the excess air pressure in the tire tube.

The invention has for another of its objects to provide an improved pressure controlling valve and seat therefor, and means for guiding said valve to its seat and preventing lateral oscillation of the same, said means also affording a maximum surface for the excess air pressure to act against and unseat the valve.

It is an additional object of my invention to provide a combination auxiliary inflating valve and pressure regulating device including a body having a plurality of outlet ports for the excess air, and a resilient closure common to all of the ports to prevent the entrance of foreign matter to the interior of the valve casing.

It is another object of my invention to provide a device of the above character, the several parts of which may be readily assembled or disassembled, said device, when applied, serving in lieu of the ordinary dust cap or hood for the stem of the tire valve.

With the above and other objects in view my invention consists in the novel features of construction, combination, and arrangement of parts to be hereinafter more fully described, claimed, and illustrated in the accompanying drawing, in which, Figure 1 is a longitudinal section of my improved pressure regulating device, illustrating the preferred embodiment thereof; Fig. 2 is an elevation of the same; Fig. 3 is a detail perspective view of the releasing member for the tire valve; and Fig. 4 is a detail plan view of one of the parts.

Referring in detail to the drawing, 1 designates the stem of the ordinary tire valve which is mounted in the rim of the wheel in the usual manner and through which air is supplied to the pneumatic wheel tire. This stem constitutes the means of attachment for my improved combination pressure regulator and auxiliary inflating valve. This pressure regulator includes a body consisting of the sections 2 and 2', respectively, the section 2 being formed on one end with a reduced interiorly threaded extension for engagement upon the threaded stem 1, as clearly shown in Fig. 1 of the drawing. It will be noted that the inner end of this hollow extension of the valve body forms an air receiving chamber $2^a$ which surrounds the reduced end of the stem 1. The other end of the body section 2 is also reduced in diameter and exteriorly threaded to receive the interiorly threaded end of the body section 2', as indicated at $2^b$. The body section 2 is bored to provide a central air receiving pocket or chamber 3 therein, a relatively small longitudinal passage 3' connecting said pocket with the chamber $2^a$, and a relatively large longitudinal opening $3^a$ which extends from the air pocket 3 to the end face of the body section, at which point, an annular knife edge valve seat 4 is formed. At this point, attention is directed to the fact that the opening $3^a$ is only of slightly less diameter than the pocket 3.

Within the chamber $2^a$ of the body section 2 and surrounding the outer end of the longitudinal passage 3', the releasing member 5 is suitably secured. This member is in the form of a hollow cylindrical cap and is provided with a plurality of small apertures 5' which afford communication between the pocket 3 and the chamber 2ª. This cap member, when the device is applied to the stem 1 of the inflating valve, is adapted to engage the spring held valve stem and unseat the inflating valve so that air may freely enter through the stem 1 into the tube of the pneumatic tire.

The other body section 2' is provided at the inner end of its threaded portion 2ᵇ with a series of spaced air outlet ports 6. The outer surface of this body section is formed with an annular groove intersecting these ports, and in this groove, a ring or annulus of rubber or other yieldable material, indicated at 7, is normally engaged, and provides a common resilient closure for said ports. The other end of the body section 2' is also interiorly threaded to receive an exteriorly threaded portion of the adjustable extension 8. This extension is formed with an annular enlargement having a beveled graduated surface 9 and a longitudinally extended flange 11 concentrically spaced from the threaded portion of said extension. This flange 11 is adapted to snugly fit over the exterior face of the body section 2' when the extension 8 is threaded inwardly. The flange 11 is provided in its outer face with a plurality of spaced grooves 10 which are adapted to receive the yieldable rod or spring member 12, whereby the extension 8 is held against casual turning movement from its adjusted or set position. This spring 12 is suitably fixed at one of its ends to the body section 2'.

The pressure regulating valve proper, indicated at 13, is in the form of a metal disk having a chambered or recessed bottom face to receive the packing gasket 14, of hard rubber or other similar material. A threaded boss or stud 13' is integrally formed with the valve disk 13 and projects longitudinally from the recessed face thereof. Upon this boss, a combination guide member 15 and retaining element for the gasket 14, is threaded. This guide member is provided in its peripheral face with spaced grooves or channels 15' through which air may pass from the pocket 3 to impinge upon the bottom face of the gasket 14. This guide member 15 when threaded inwardly upon the boss 13', bears against the gasket 14 and serves to securely retain the same in place within the recess of the valve disk 13. It will further be noted that the member 15 fits snugly in the opening 3ª of the body section 2, so that it will always cause a biting engagement of the knife edge valve seat 4 upon the gasket 14 at the same place and thus prevent cutting or mutilation of the gasket face and leakage of the air between the same and the valve seat. In addition to the above stated function of the member 15, the bottom face of this member, opposed to the pocket 3, affords a maximum surface area for the air entering said pocket to act against, and thereby cause an immediate movement of the valve from its seat to its open or released position.

The stem 16, integrally formed with the valve disk 13, extends longitudinally through the spring receiving chamber 8' of the adjustable body extension 8, and is slidably engaged in the longitudinal bore 8ª of the reduced outer end of said extension. The pressure regulating spring 17 surrounds said valve stem and is engaged at one of its ends with the inner base wall of the chamber 8' and at its other end with the upper face of the valve disk 13. The upper end of the valve stem 16 is exteriorly threaded to receive the cap member 18, and a protecting hood or housing 19 is disposed over this cap member and threaded upon the reduced upper end 8ᵇ of the extension 8. The valve stem 16 is longitudinally bored from its upper end, as shown at 21, and an air passage 22 of relatively small diameter communicates with this bore and opens upon the end face of the threaded stud 14. In the bore 21 of the valve stem, the usual inflating valve mechanism is arranged, the same including the plug 23 arranged in the flared outer end portion of the bore 21 and bored to receive the stem 24 which is connected to the check valve disk 25. This disk is normally seated against the inner end face of the plug 23 by means of the coil spring 26 surrounding the stem 27 which is fixed to the chair member or spider 28 resting upon the annular shoulder at the inner end of the bore 21.

Having now described the several structural features of my invention, its operation will be understood as follows. Assuming that the device has been applied to the stem of the tire valve in the manner shown in Fig. 1, and the extension 8 adjusted to the desired air pressure to which it is intended to inflate the pneumatic tire, the cap 18 is removed from the valve stem 16 and the hose or tube from an air pump or reservoir attached thereto. When the air is admitted to the bore of the valve stem, it will be understood that the valve 25 is unseated and this air enters through the valve stem into the pocket 3. The inflating valve in the stem 1, having been opened by the engagement of the cap 5 with the valve stem, the air will escape from the pocket 3 through the stem 1 and into the tire tube. When the air pressure within the tire tube reaches the predetermined point which the spring 17 has been adjusted to sustain, the back pressure enter- ing the pocket 3 and passage 22, immediately cuts off the further entrance of air into said pocket, and this excess air pressure in the pocket 3, acting against the face of the guide member 15 and the gasket 14, lifts the valve member 13 from its seat 4 so that such excess air may pass from the pocket into the space between the valve member and the inclined face of the valve seat. This air, entering through the ports 6, exerts an outward pressure upon the resilient band 7 and escapes to the atmosphere. The minute opening afforded for the escape of this air from the orifices 6, causes a hissing or whistling sound, so that the attention of the operator is immediately drawn to the fact that the tire has been inflated to the maximum pressure at which the regulating device has been adjusted, and the air supply is then cut off. In this manner, all danger of over-inflation of the tire tube is obviated. The pressure release valve will also act as efficiently, when the pressure within the tire increases during the use thereof, owing to expansion of the air due to heating of the same, or the violent contact of the tire with obstructions in the road. It will also be seen that by the provision of an auxiliary inflating valve which is contained within the stem of the pressure regulating valve, an additional emergency inflating valve is obtained, as an adjunct to the ordinary valve with which the tire is provided. This valve, when the stem is equipped with my improved combined auxiliary inflating valve and pressure regulator, is always open, and as it is protected by the body of my improved device, injury thereto is effectually precluded. Therefore, if it should occur that the inflating valve mechanism carried by the pressure regulating valve, becomes inoperative, the device may be removed from the stem 1 and the tire inflated through the valve provided thereon. The great convenience and serviceability of the present invention will, therefore, be manifest. The several parts of the device may be very easily and quickly disassembled in order to replace the pressure regulating spring by a new one or to make other repairs, and the parts then again assembled in proper relation and applied to the stem of the tire valve. It will thus be appreciated that I have produced a thoroughly practical, durable and efficiently operated mechanism as an accessory or auxiliary attachment to the common tire valve now in general use, and which may be advantageously employed without necessitating any alterations whatsoever in the construction of the tire valve. The device may also be produced at comparatively small manufacturing cost.

While I have shown and described the preferred construction and arrangement of the several elements, it will be understood that the same is susceptible of considerable modification therein, and I, therefore, reserve the privilege of resorting to all such legitimate changes as may be fairly embodied within the spirit and scope of the appended claims.

Having thus fully described my invention, what I desire to claim and secure by Letters Patent is:—

1. A pressure regulating device for tire valves including a valve body having a threaded bore for engagement upon the stem of the tire valve and provided with means for opening said valve, said body also having an air receiving pocket and a passage connecting said pocket with said bore, said body being further provided with a relatively large longitudinal opening communicating with the opposite side of the pocket at one of its ends, a knife edge valve seat formed in the body at the opposite end of said opening, a valve in the body, a gasket carried by the valve for engagement with said seat, a retaining member for said gasket snugly fitting within the latter opening of said body and constituting a guide for the valve, said retaining member being opposed to said air pocket and presenting an extended surface against which the excess pressure in the tire may act to unseat the valve, said body adjacent to the valve seat being provided with a plurality of air exhaust ports.

2. A pressure regulating device for tire valves including a valve body provided with means for detachable engagement upon the stem of a tire valve, means on said body for opening said valve, said body having an air receiving pocket and a longitudinal opening communicating therewith, a valve seat formed in the body at one end of said opening, a spring pressed valve having a stud normally disposed within said opening, a gasket carried by the valve for engagement upon said seat, and a retaining member threaded upon said stud to retain the gasket in place, said member having portions contacting with the wall of said longitudinal opening to guide the valve in its movement, said body adjacent to the valve seat being provided with a plurality of exhaust ports.

3. The combination with the inflating valve of a pneumatic wheel tire, of a combined auxiliary inflating valve and pressure regulating device including a body formed in two sections having detachable threaded engagement with each other, one of said sections having an interiorly threaded stem for detachable engagement upon the stem of the tire valve, said latter section being provided with a valve seat, a spring pressed pressure regulating valve mounted in the other body section for engagement upon said seat, an adjustable extension threaded in the latter body section and engaged with the valve spring to regulate the tension thereof, said pressure regulating valve having a stem longitudinally movable in said extension, said stem being longitudinally bored to provide an air passage through which air may be admitted to the tire valve, auxiliary inflating valve mechanism arranged in the bore of said valve stem, a cap threaded upon the outer end of said stem to close the bore thereof, and a protecting hood disposed over said cap and threaded upon the adjustable extension of said body.

In testimony whereof I hereunto affix my signature in the presence of two witnesses.

CHARLES HENERY THAYER.

Witnesses:
 CLAUDE O. STUART,
 G. A. GUCKER.